March 21, 1950

E. G. SCHMIDT 2,501,635

ROTARY PLUG VALVE

Filed April 19, 1945

Inventor:
Edward G. Schmidt:
By Joseph O. Lange
Atty.

Inventor:
Edward G. Schmidt
By: Joseph O. Lange
Atty.

Patented Mar. 21, 1950

2,501,635

UNITED STATES PATENT OFFICE 2,501,635

ROTARY PLUG VALVE

Edward G. Schmidt, Western Springs, Ill., assignor to Crane Co., Chicago, Ill., a corporation of Illinois Application April 19, 1945, Serial No. 589,179

1 Claim. (Cl. 251—102)

This invention relates to valves. More particularly, it pertains to a novel rotary plug valve having relatively easy operating, retractable types of closure members or discs capable of effecting fluid tightness with the casing or valve body with a minimum amount of seating effort by the operator.

Another important object is to provide a valve of the character hereinafter described preferably but not necessarily employing comparatively soft seats for the disc faces.

Heretofore, however, in connection with the use of seat- or disc-faces for valves of the type referred to, a source of much difficulty has been encountered in overcoming rapid wear of the seating material because of sliding or rubbing action of the seat faces in their movement from open to closed position and vice versa.

With the foregoing problem in mind, in the instant contribution to the art a rotary plug valve has been developed with the valve discs preferably having composition faces or with the body employing composition seats or both and combined with a retracting mechanism which prevents the sliding action and objectionable wear of the composition faces previously complained of.

Another important object of this invention is to provide a construction in which the cost of manufacture is relatively low and in which the matter of parts, replacements or repairs can be accomplished without considerable expense or inconvenience.

Other objects and advantages will become more readily apparent upon proceeding with the specification read in light of the accompanying drawings, in which Fig. 1 is a vertical sectional assembly view of a valve embodying my invention, the valve being shown in the closed position.

Figure 1:
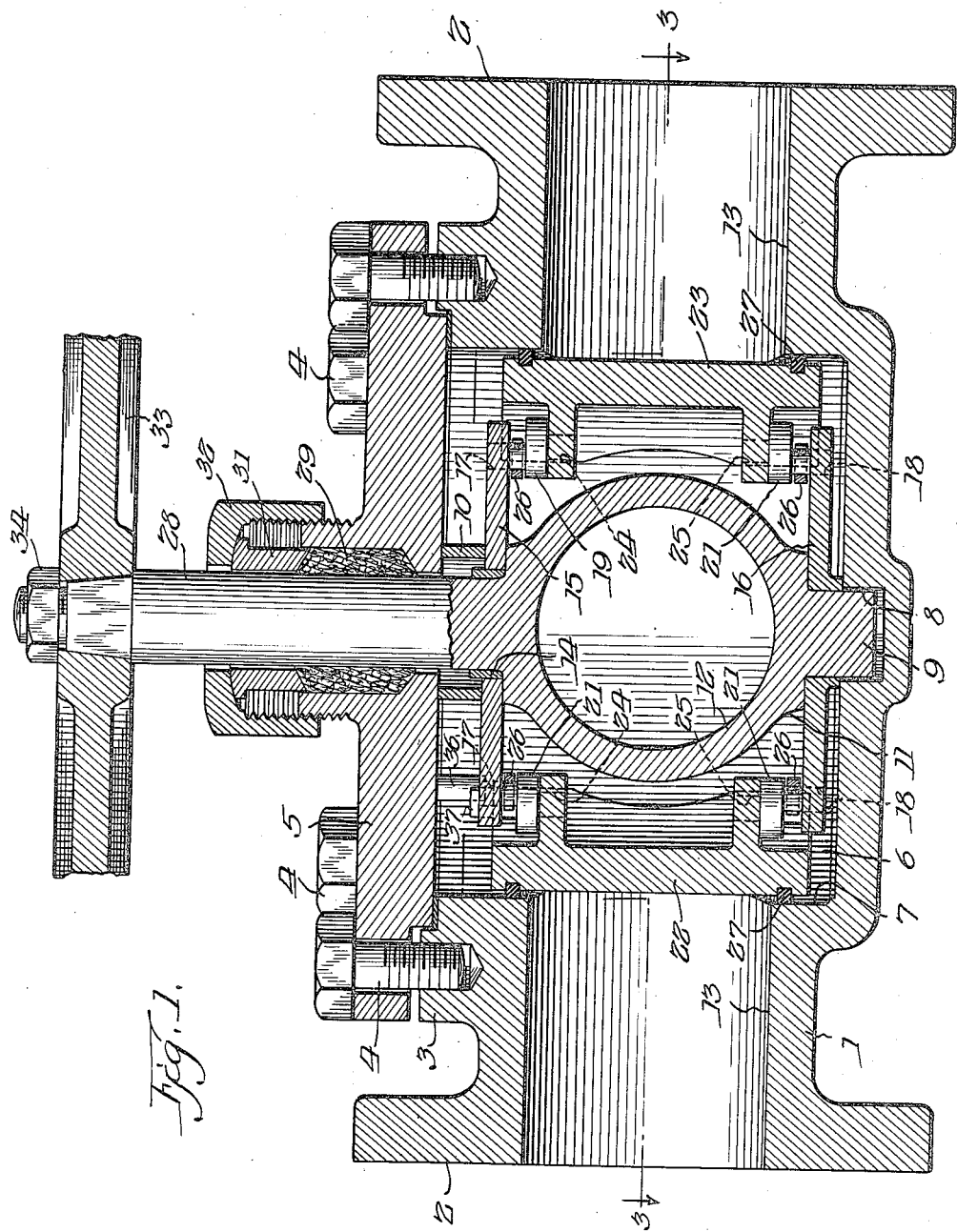
Figure 2:
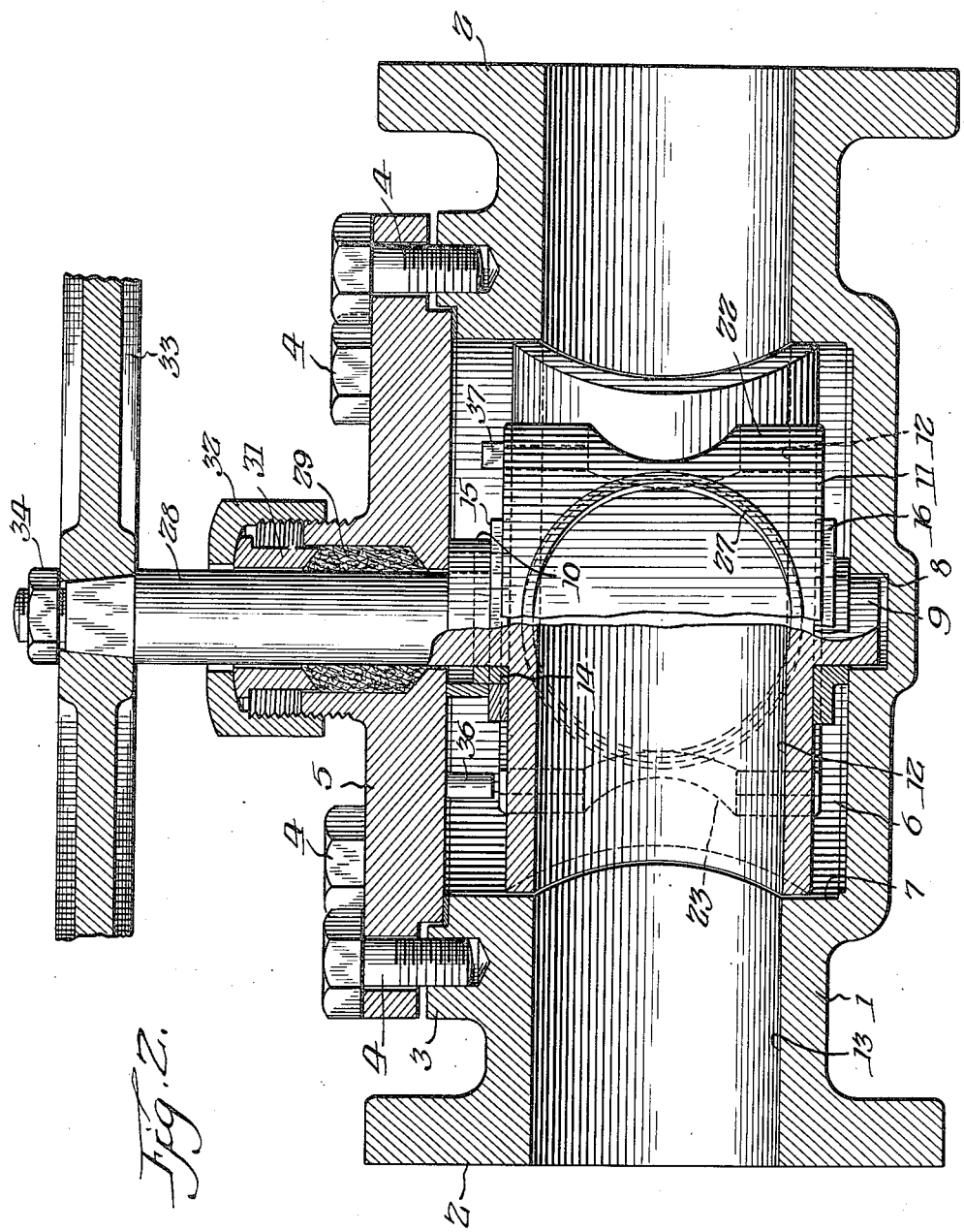
Fig. 2 is a view similar to Fig. 1 showing the valve in the open position.

Referring now to Fig. 1, the valve body or casing 1 is provided with the usual pipe connecting portions or flanges 2. The bonnet flange 3 is adapted to receive the bolt studs 4 for retention of the bonnet 5 to the casing 1, the casing being provided with a central chamber 6 preferably of cylindrical form having the peripheral walls 7 extending substantially the full height of the body, as indicated. At the lower portion of the chamber 6, a well or guide recess 8 is provided for reception of the cylindrically formed pilot 9 of the core or plug carrier member 11. As more clearly indicated in Fig. 1, the plug carrier 11 is made preferably in one piece and has a central cylindrical aperture 12 permitting desirable straight through flow of fluid within the valve casing 1, since in the open position of the valve as shown in Fig. 2, the passage 12 coincides with a complementary passage 13 in the casing. A small hexagon bushing 14 is preferably brazed to the upper portion of the plug to permit the attachment of the core 11 to the upper spider plate 15. Similarly, the lower spider plate 16 is brazed to the pilot 9 of the core. It should be clear that the latter method of attachment is without special significance, and other convenient methods of attachment may be employed as well. The top and the bottom spider plates 15 and 16 are provided with the holes at each end, respectively indicated 17 and 18, for journaling the upper and lower crank type eccentric pins 19 and 21, in the same order. Similarly, as shown in Fig. 1, the discs 22 and 23 are provided with the apertures 24 and 25 for effecting a journaling assembly with the pins 19 and 21 respectively. The pins 19 and 21 are formed with sufficient eccentricity so as to provide the desired amount of retraction necessary for proper valve operation and the latter retractability will vary with the kinds of valve seats or disc facings employed. It should be understood that the character of service for which the valves are recommended will have a strong influence upon the ultimate selection.

Figure 3:
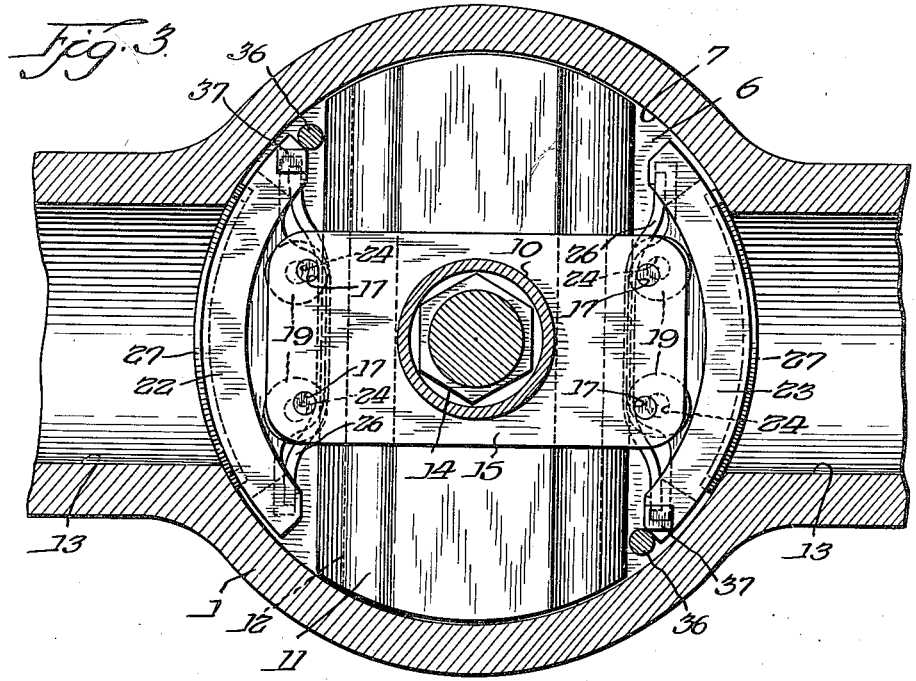
Fig. 3 is a fragmentary plan sectional view taken on the line 3—3 of Fig. 1 showing the retractable mechanism employed.
Figure 4:
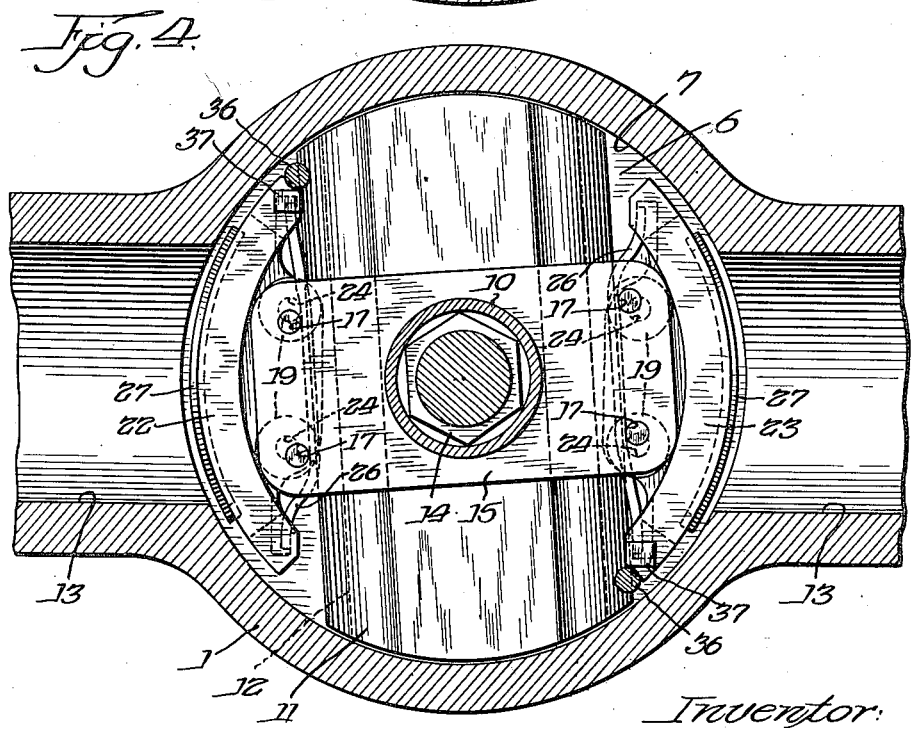
Fig. 4 is a view similar to Fig. 3 showing the retractable mechanism just before the valve is ready to be seated.

As shown more clearly in Figs. 3 and 4, flat-leaf springs 26 with ends held as indicated are provided at the top and bottom of the pivotably movable discs 22 and 23 adjacent their respective pin mountings in order to effect the retraction of the same when desired and after predetermined rotative movement of the core. Preferably, although not necessarily, each of the discs may be fitted with the annularly extending resilient seat ring 27 bearing against the cylindrical surface 7 of the casing 1 to effect seat tightness, as hereinafter explained. For its actuation, the upper portion of the closure member carrier 11 is provided with the stem 28 projecting through a stuffing box 29, past the gland 31 and the stuffing nut 32. As apparent in Fig. 3, the valve operates preferably in a range of approximately 90 degrees from open to closed position and vice versa, and this is accomplished by a handwheel or lever designated 33 held in position upon the stem 28 by means of the nut 34. Within the bonnet, and bearing against the upper portion of the valve, a sleeve-like bushing 10 is used to hold the carrier 11 in fixed position insofar as substantial longitudinal movement is concerned. For limiting the movement of the valve in its closed and opened positions, the stop pins 36 are used to engage respective lugs 37 on the disc faces 22 and 23.

Now therefore, in considering the operation of the valve from the open to closed position, it should be understood that the discs 22 and 23 are retracted initially by means of the springs 26. Thus, with the discs retracted the only forces necessarily applied to the carrier 11 in closing the valve would be those required to cause rotation. When the discs reach the rotative position required for seating, that is, the closed position as shown in Fig. 4, the stop 36 prevents further rotation of the discs 22 and 23 and of the carrier 11 in which case the pins 19 and 21 occupy the position shown. However, as the slight rotative motion of the spiders 15 and 16 continues, corresponding journaling movement of the eccentric or crank type pins 19 and 21 about the axes of the holes in the discs takes place. By this operation there is thus created the effect of a cam tending to force the discs 22 and 23 outwardly against the seating surfaces 7 in the body 1 to form a tight joint as shown in Fig. 3. It is desirable, in order to prevent the valve from opening under pressure, that the eccentric pins should be rotated just a slight distance past dead center to provide a locking action. The relatively compressible disc rings 27 will permit such rotation of the eccentric pins to aid in the locking action.

In the opening operation of the valve, reverse transverse movement of the discs and eccentric pins from that above described will occur. That is, rotation of the carrier 11 and the spiders 15 and 16 in the opposite direction will initially effect rotation of the eccentric pins, causing a slight compression of the disc faces at 27. Subsequently, the compresssion load against the disc faces is released, the action of the springs 26 then causing simultaneous retraction of the discs from their respective contact faces in the valve casing. The valve may now be easily rotated to its open position at which phase of operation the cylindrical passage of the carrier 11 coincides with the port openings 13 of the body 1 to provide a smooth flow way therethrough. Objectionable rubbing or abrading movement of the discs across the seating faces in the opening or closing operation is overcome for the reason that initially sufficient surface friction is present between the discs 22 and 23 and the seat faces 7 so as to permit the eccentrics 19 and 21 to be rotated well past the dead center position. Thus the springs 26 are enabled to overcome the line pressure load exerted against the outlet or downstream disc and to effect desirable snap action retraction of the discs 22 and 23 preliminary to their rotation in either direction.

In connection with the use of the compressible disc rings 27, it should be realized that the life of the latter members is increased as a result of placing them under load within a confined space, the working or kneading action to which the composition thereof is subjected preventing the usual objectionable crystallization. Also the sealing faces, because of the amount of flexibility and resilience inherent in the material, afford an effective seal against leakage, and because of the elastic properties of the material of the retracting disc faces, a desirable locking action is achieved after the disc faces are moved beyond dead center by means of the eccentric pin mechanism previously described.

It should be understood that the spring and the mounting thereof may vary substantially from that illustrated and described and this is also true of the relative arrangement of the discs or closures 22 and 23 with the ported carrier 11. Thus it should be clear that it is not the desire to be limited to the precise construction, arrangement and operation of parts as hereinabove shown and described, since it is manifest that numerous variations and modifications in the detailed structure and arrangement may be employed, and the device may be adapted for use in various positions and connections, without departing from the spirit and scope of my invention. Reservation of the right is therefore made to all such variations and modifications as properly fall within the scope of my improvements and terms of the following claim.

I claim:

A rotary plug valve, including a casing with a passage therethrough, a closure member therefor interrupting the passage, the said closure member comprising a rotatable ported carrier and a pair of retractable discs oppositely supported on the said carrier, the said discs having inwardly projecting portions, upper and lower apertured plate means at top and bottom portions of the said carrier mounted in non-rotatable relation to the said carrier and predeterminedly movable with the carrier relative to the said discs, stops for limiting the rotation of the said discs in the open and closed positions of the valve, vertically extending crank type pins journalled in the apertures of the said plate means and positioned between the said plate means and the inwardly projecting portions of the said discs, resilient means extending between the discs and the said pins and normally having a portion bearing frictionally against offset peripheral portions of the said crank type pins, the said discs being mounted on said crank-pins and having resilient annular compressible seats whereby in substantially closed position of the carrier the said discs are movable radially outward against annular surfaces around the casing passage to compress the said seats, the said stops in the latter condition of said seats cooperating with the said crank type pins to limit further rotation of the said discs while permitting said additional limited rotation of the carrier and plate means relative to the said discs whereby said outward radial movement of the discs is effected relative to the said crank-pins and the said resilient seats are predeterminedly compressed around the casing passage thereby to permit said limited rotation of the crank pins subsequently beyond dead center and lock the said dics in seated position.

EDWARD G. SCHMIDT.

REFERENCES CITED

The following references are of record in the file of this patent:

UNITED STATES PATENTS

| Number | Name | Date |
| --- | --- | --- |
| 1,985,449 | Heggem | Dec. 25, 1935 |
| 2,261,535 | Wheatley | Nov. 4, 1941 |
| 2,290,332 | Johnson | July 21, 1942 |